May 22, 1962 E. SIEGLER 3,035,561
INSTALLATION AND A METHOD OF SETTING ASIDE NOISES IN
MOTORCARS FOR COMBUSTION AND SIMILAR VEHICLES
Filed Nov. 13, 1957 3 Sheets-Sheet 1

INVENTOR:
ERWIN SIEGLER

May 22, 1962    E. SIEGLER    3,035,561
INSTALLATION AND A METHOD OF SETTING ASIDE NOISES IN
MOTORCARS FOR COMBUSTION AND SIMILAR VEHICLES
Filed Nov. 13, 1957    3 Sheets-Sheet 2

INVENTOR:
ERWIN SIEGLER

May 22, 1962 E. SIEGLER 3,035,561
INSTALLATION AND A METHOD OF SETTING ASIDE NOISES IN
MOTORCARS FOR COMBUSTION AND SIMILAR VEHICLES
Filed Nov. 13, 1957 3 Sheets-Sheet 3

INVENTOR:
ERWIN SIEGLER

United States Patent Office 3,035,561
Patented May 22, 1962

---

3,035,561
INSTALLATION AND A METHOD OF SETTING ASIDE NOISES IN MOTOR-CARS FOR COMBUSTION AND SIMILAR VEHICLES
Erwin Siegler, 12 Sulengasse, Schwabisch Hall, Germany
Filed Nov. 13, 1957, Ser. No. 696,244
Claims priority, application Germany Nov. 19, 1956
1 Claim. (Cl. 123—119)

The present invention relates to an arrangement to eliminate or at least reduce the noise created by the exhaust of combustion engines in motor cars, and for preventing the discharge of exhaust gases into the air.

The object of the present invention is accomplished by providing a single conduit between the exhaust outlet of a combustion engine and the fuel intake of the combustion engine so that the exhaust gases are returned to the engine intake where they are mixed with fuel.

Separating means are provided in the conduit by which solid particles, and water are eliminated from the exhaust gases so that no accumulation of solid particles can damage the combustion engine. In order to supply the necessary oxygen, an air inlet nozzle is connected to the conduit from which air is drawn by the injector effect of the flowing exhaust gases. In this manner, the engine can be operated, while discharge of unwholesome exhaust gases into the air on a street or in a garage is avoided, while at the same time the noise developed by the engine is reduced. The arrangement of the present invention also results in a considerable saving of fuel, and since air is added to the exhaust gas by the injector effect of the exhaust gas on an injector nozzle, a blower or compressor is not necessary in the arrangement of the present invention, so that the engine need not supply power for driving a compressor.

The arrangement of the present invention can be easily provided for an existent combustion engine. The connecting conduit of the invention includes filters which are removable for cleaning, and each filter preferably is subdivided to have parallel conduits which may be filled with metal particles for the elimination of combustion residues and for cooling of the exhaust gases.

A fresh air inlet is advantageously provided in the conduit, which may be opened and closed by a manual operation.

A preferred embodiment of the invention is illustrated in the accompanying drawings in which.

Figure 1:
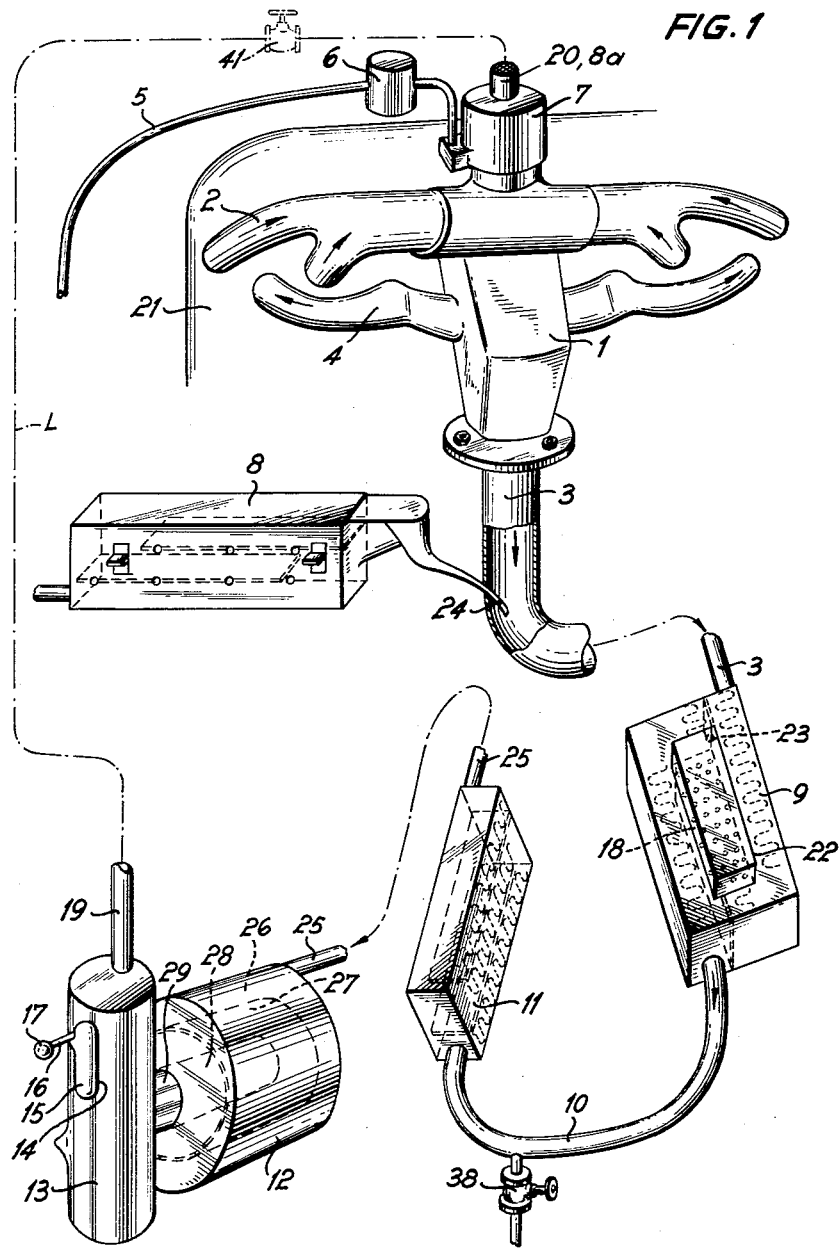
FIG. 1 is a schematic perspective view illustrating the arrangement of the invention.
Figure 2:
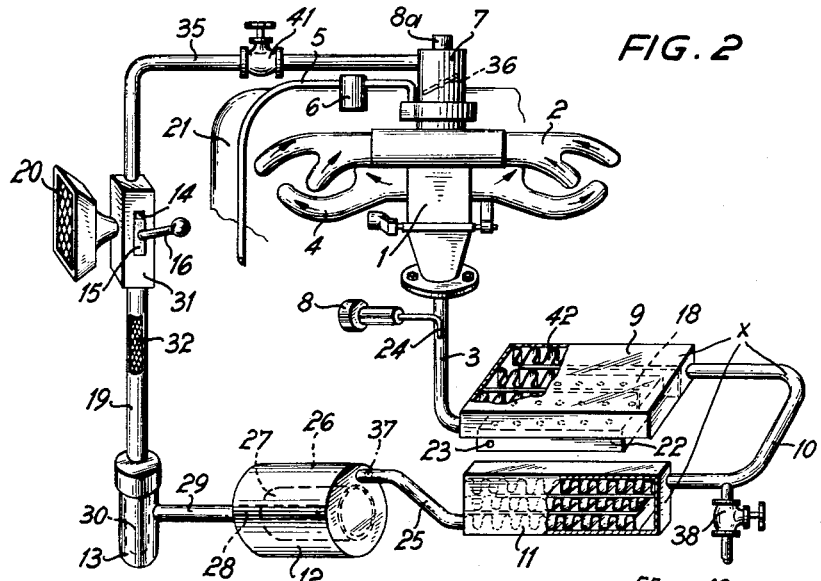
FIG. 2 is a schematic perspective view illustrating the arrangement on a smaller scale.
Figure 4:
FIG. 4 illustrates a detail of a filter used in the arrangement.

Referring now to the drawings, the exhaust gases are guided from a manifold 2 past a heater 1 to the conduit 3, the heater 1 serving to heat the fuel air mixture which is supplied to the inlet pipe 4. The fuel is supplied over fuel pipe 5 and cleaner 6 to the carburetor 7 which has the conventional air inlet 8a as shown in FIGS. 2 and 4. Conduit 3 includes devices 9, 11, 12, 30 and 31 which will be described hereinafter in greater detail, and connects the exhaust manifold 2 with the fuel intake of the combustion engine, and more particularly with the carburetor 7. In this manner, all exhaust gases are again guided to the intake of the combustion engine. Conduit 3 passes underneath the chassis, passes through filter 9, continues as a curved part 10, passes through a filter 11, and is connected by a portion 25 to the receiving means 12 which is connected with a container 13 by a conduit part 29. Container 13 has an opening 14 which may be opened and closed by a closure plate 15 operated by handle 16 having a knob 17 in the embodiment of FIG. 1. In the slightly modified embodiment of FIG. 2, the container is extended by conduit 19 and another part 31, part 31 having the opening 14 and the closure plate 15. An air intake 20 is provided on part 31 so that air is drawn in and admixed to the exhaust gases in addition to the air supplied by the air supplying means 8 with the injector nozzle 24, and to the air supplied through air inlet 8a. Since all exhaust gases are returned by conduit 3 to the intake means of the engine, only so much air is added to the exhaust gases, as is required for providing oxygen for the combustion.

The device 9 receives the exhaust gases directly from the engine and has a perforated plate 18 which separates an inner space from a collecting bottom trough 22 where sludge is collected to be discharged through a small hole 23. Means 42 provide a tortuous path in the separator means 9.

The exhaust gas passes through conduit portion 10 into another filter means 11 where it also passes through perforated filter plates. The exhaust gas is then guided by conduit portion 35 into a third device 12 which is of cylindrical shape and has inner cylindrical walls so that the gas passes first into the annular space 26, is reversed to flow in opposite direction into the central annular space 27, and then passes through the tube 28 into conduit portion 29.

Figure 3:
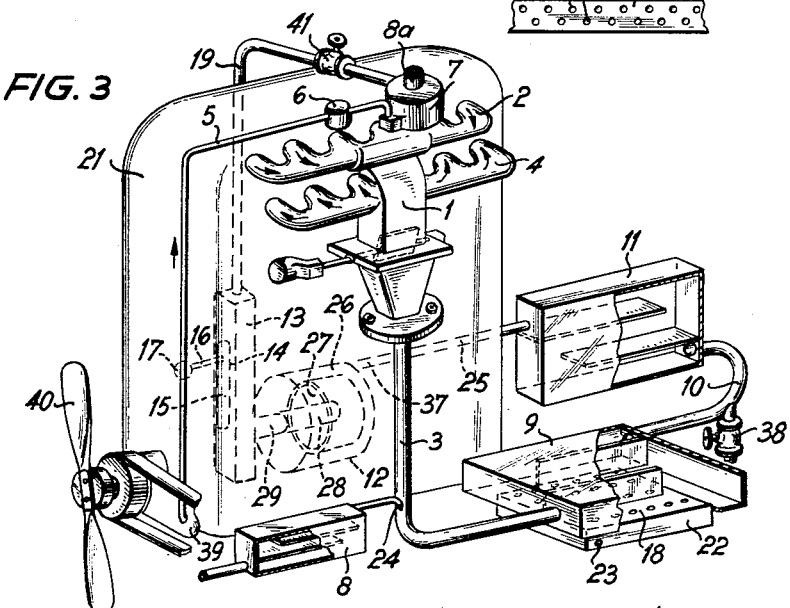
FIG. 3 is a perspective view showing the entire arrangement of the invention as provided in a combustion engine.
Figure 5:
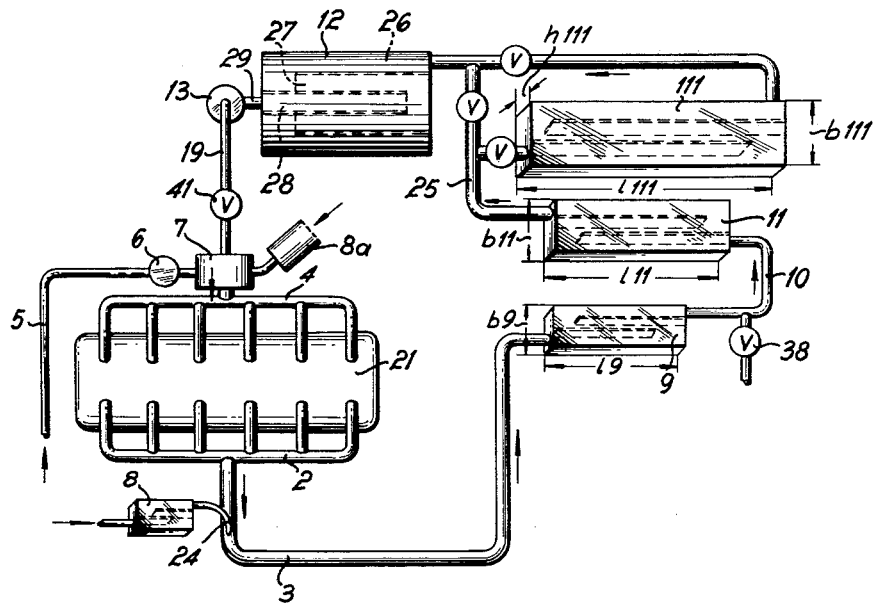
FIG. 5 is a diagram illustrating the fluid circuit of the invention.

The devices 9, 11 and 12 are preferably arranged as shown in FIG. 3 so that they are located substantially in a horizontal plane in the region of the lower part of the combustion engine 21.

Conduit portion 29 is connected to a water separator container 13 into which a tube 19 projects whose free end is spaced from the bottom of container 13, so that water is trapped in container 13, while the exhaust gases further pass through tube 19 and into conduit portion 30. In the embodiment of FIG. 1, an opening 14, which can be closed and opened by a plate 15, is provided in container 13. In the embodiment of FIG. 2, the exhaust gases first pass through a cleaning mesh 32, and then into a chamber 31 provided with the air inlet 14 and the closure plate 15. Chamber 31 has an air inlet 20 provided with a filter. Between air filter 20 and chamber 31, a check valve 33 is provided which will automatically open if the pressure in chamber 31 drops a certain amount below atmospheric pressure, so that fresh air will enter chamber 31 when the pressure in the same drops due to the suction effect of the combustion engine. Chamber 31 is connected by conduit portion 35 to the carburetor 7. A regulating valve 36 is provided on the carburetor 7. The air inlet 8a includes a filter, and can be closed, if desired.

The filter devices 9 and 11 are removably mounted on conduit 3 so that they may be taken out to be cleaned or repaired. As mentioned above, filter 9 has a discharge opening 23 which may also aid the pressure compensation in the conduit 3. Filter 12 may be considered as a cleaning device, and is filled with metal chips, or nylon bristles. Conduit 3 may be heated at 37, if desired, before entering the cleaning device 12.

I claim:

Arrangement for recirculating exhaust gases from the exhaust outlet means to the air and fuel intake means of an internal combustion engine, which comprises a single continuous conduit including separating means constructed to intercept and eliminate substantially only non-gaseous matter carried by said exhaust gases, said continuous conduit having an outlet connected with said air and fuel intake means and having an inlet connected with said exhaust outlet means so that said exhaust gases pass through said separating means for supplying the purified gaseous components thereof substantially free of non-gaseous matter to said intake means; and air suction means communicating with the atmosphere and opening into said conduit means so that the stream of exhaust gases sucks air through said air suction means into said conduit means.

References Cited in the file of this patent

UNITED STATES PATENTS

| | | |
|---|---|---|
| 1,120,828 | Lowry | Dec. 15, 1914 |
| 1,138,581 | Shumaker | May 4, 1915 |
| 2,325,543 | Redinger | July 27, 1943 |
| 2,637,307 | Cushman | May 5, 1953 |
| 2,737,936 | Clarke | Mar. 13, 1956 |

FOREIGN PATENTS

| | | |
|---|---|---|
| 120,549 | Australia | Nov. 1, 1945 |